L. L. SUMMERS.
PREPARING NITROGENOUS COMPOUNDS.
APPLICATION FILED MAY 6, 1909.
1,033,842.
Patented July 30, 1912.
2 SHEETS—SHEET 2.
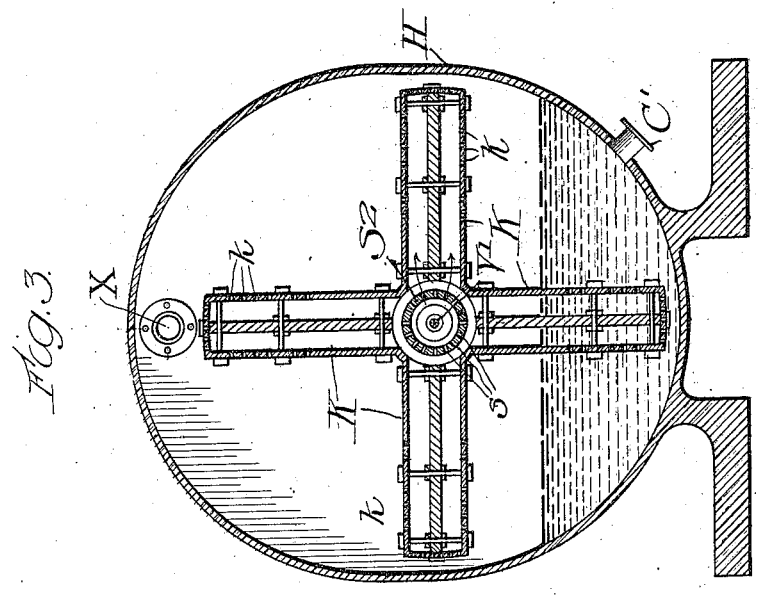
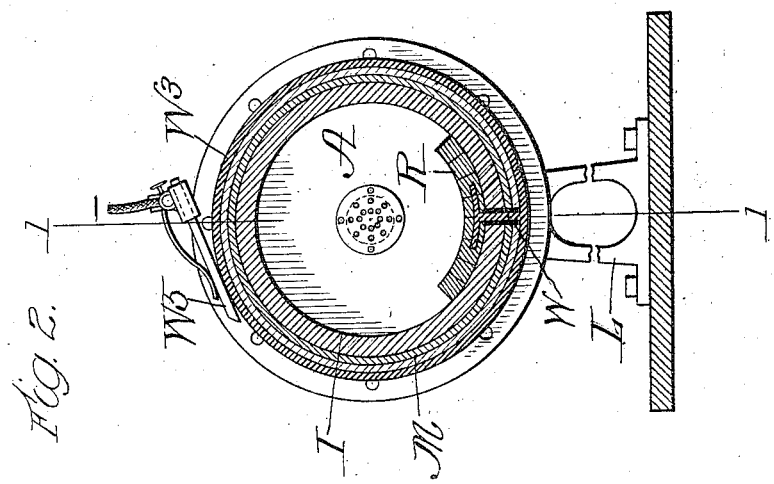
WITNESSES:
INVENTOR
ATTORNEYS

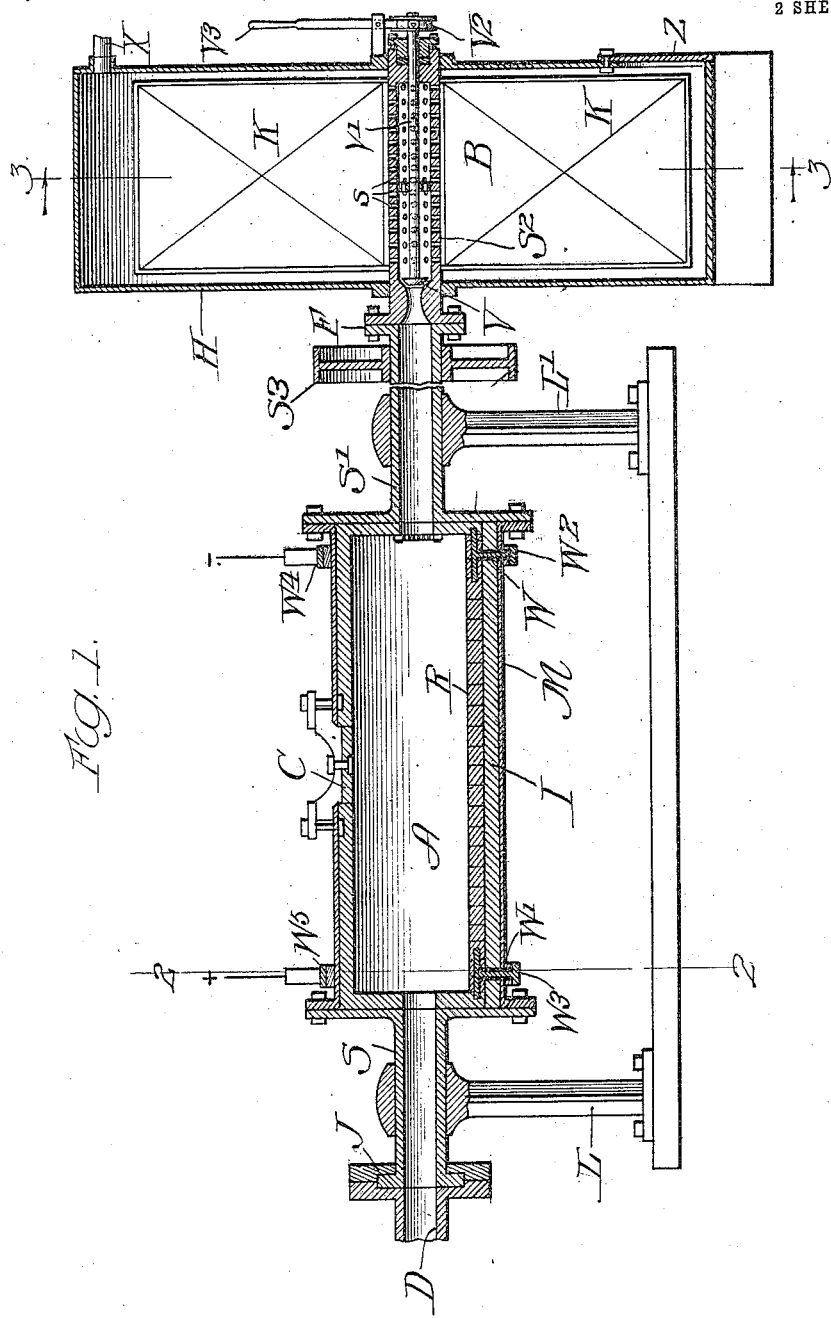

UNITED STATES PATENT OFFICE.

LELAND L. SUMMERS, OF CHICAGO, ILLINOIS.

PREPARING NITROGENOUS COMPOUNDS.

1,033,842.  Specification of Letters Patent.  Patented July 30, 1912.

Application filed May 6, 1909. Serial No. 494,386.

*To all whom it may concern:*

Be it known that I, LELAND L. SUMMERS, a citizen of the United States, residing at Chicago, Cook county, Illinois, have invented a new and useful Process of Preparing Nitrogenous Compounds, of which the following is a specification.

The object of my invention is to provide a new and useful process of preparing or forming nitrogenous compounds, such as cyanogen $C_2N_2$ and ammonia $NH_3$, together with the numerous salts derived from these compounds, the nitrogen from the atmosphere being preferably used, though other sources of nitrogen may be utilized, as hereinafter made apparent.

Speaking in general terms, my process consists in preparing nitrogenous compounds by treating a metal nitrid with ammonia and hydrogen in the presence of heated carbonaceous material and in the practice of my process I prefer to form a compound of cyanogen with ammonia or with an alkali metal or with hydrogen, as less energy is necessary to form the cyanogen compounds and a lower temperature may be used in the apparatus.

Inasmuch as the invention of this application for patent relates to the process, it is independent of the particular means or apparatus employed, but for the purpose of a clear and definite description of my invention I have chosen to describe it in connection with an apparatus of a character suitable for the practice of said invention or process.

In the drawings, Figure 1 is a section of said apparatus on the line 1—1 of Fig. 2; Fig. 2 a cross-section taken through the retort on the line 2—2 of Fig. 1 but on a larger scale; and Fig. 3 a section on the line 3—3 of Fig. 1 on a reduced scale.

A rotary drum A is supported upon standards L L' by means of hollow trunnions S S' extending from opposite ends of the drum. These trunnions communicate with the interior of the drum and the trunnion S is flanged beyond the standard L and coupled to a supply pipe D by means of a coupling plate J attached to the flange of the supply pipe. The hollow trunnion S' is secured to a perforated conduit or tube $S^2$ which forms the rotary support for hollow vanes K which revolve within the absorber H. The drum A is provided with a refractory lining I within the metal shell M and an electric resister R of carbon or other suitable material extends from end to end of the drum and is connected by means of conductors W and W' at the opposite ends of the drum with exterior annular conductors $W^2$ and $W^3$ which are in turn engaged by brushes $W^4$ and $W^5$, which supply the current for heating the interior of the drum.

At C is shown a manhole for giving access to the interior of the drum for charging, cleaning, etc. Rotation is imparted to the drum by means of a band wheel or pulley $S^3$ upon the hollow trunnion S' and communication between the hollow trunnion and the perforated tube section $S^2$ is controlled by a valve V having a valve stem V' the outer end of which bears a grooved head $V^2$ engaged by a hand lever $V^3$ for operating the valve.

At $s$ are shown perforations by which the tube section $S^2$ communicates with the interiors of the hollow vanes K and the latter are in turn provided with apertures $k$ by which the gas may pass to the interior of the absorbing chamber H and to the liquid contained therein.

At C' I have indicated an outlet by which the liquid may be withdrawn when suitably impregnated, at X is shown an exhaust for the unabsorbed gases and at Z a manhole for securing access to the interior of the absorber.

While I have described with some particularity the apparatus by which my process is carried out, it will be understood that it is not a part of the present invention which may be readily carried out in a great variety of other apparatus.

In practice I prefer to place in the drum A a metal which is capable of uniting with nitrogen to form a nitrid, such as an alkaline earth metal, magnesium or calcium, though other metals, such as iron, zinc or aluminum, may also be used. When metallic magnesium is placed in the retort and heated to a temperature of 400° to 500° C. and nitrogen is introduced through the shaft S and the retort revolved, an intimate contact takes place between the heated magnesium and the nitrogen, the reaction being

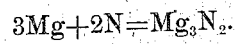

$$3Mg + 2N = Mg_3N_2.$$

If charcoal or other forms of carbon are placed in the retort in contact with the magnesium nitrid, and hydrogen H and ammonia $NH_3$ is introduced through the shaft S and the retort revolved and suitable current passed through the resistance R so that the temperature in the retort is raised to a point between 300° and 600° C., a reaction will take place in which the carbon will unite with the nitrogen of the magnesium nitrid to form cyanogen, and this will react with the hydrogen and ammonia forming ammonium cyanid $NH_4CN$ and hydrocyanic acid HCN. The ammonium cyanid is readily decomposed into hydrocyanic acid HCN and ammonia $NH_3$ at temperatures in excess of 35° to 40° C., so that the proportions of the ammonium cyanid and of hydrocyanic acid will depend upon the amount of gases introduced and the temperatures at which they are discharged into the absorber B. In this absorber I preferably place a mixture of sodium chlorid NaCl and aqueous ammonia $NH_3$ aq. The reactions in the retort will then take place in accordance with the equation $$Mg_3N_2 + 2C + 2NH_3 + 2H = 3Mg + 2(NH_4CN)$$

also a secondary reaction may take place as follows:

$$NH_4CN \rightleftharpoons NH_3 + HCN.$$

When these gases are allowed to enter the absorber through the shaft $S^1$ by opening the valve V, the reaction in the absorber will take place in accordance with the equation $$NaCl\ aq + NH_4CN \rightleftharpoons NaCN + NH_4Cl$$

and in the case of the hydrocyanic acid the reaction will take place in accordance with the equation $$NaCl + NH_3 + HCN \rightleftharpoons NaCN + NH_4Cl.$$

It will be apparent in the above reactions that the absorber may contain only an aqueous solution of sodium chlorid or it may contain a solution of sodium chlorid and aqua ammonia. The ammonia for decomposing the sodium chlorid may be transferred from the retort to the absorber by means of the ammonium cyanid or by means of the hydrocyanic acid and ammonia, or ammonia may be added direct to the solution in absorber. It will of course be obvious to anyone familiar with chemistry that it is immaterial whether ammonia and hydrocyanic acid or ammonium cyanid enter the absorber and in fact as appears above a mixture of all these substances will normally be formed and pass into the absorber. Therefore in the claims devoted to this feature of the invention I have referred only to the mixture of hydrocyanic acid and ammonia but it will be understood that these claims cover the equivalent cyanid of ammonium. It is not an essential feature of these reactions that the ammonia and the sodium chlorid be in the proportions necessary to entirely react, as in practice an excess of sodium chlorid may be used. The contents of the absorber may be removed by means of the exit pipe C and fresh solution inserted. As sodium chlorid is not readily soluble in a solution of ammonium chlorid, the excess of sodium chlorid is readily precipitated and the solution of sodium cyanid and ammonium chlorid may be removed from the absorber and subsequently treated for the recovery of the various compounds.

In the above reactions it will be noted that the metallic magnesium is recovered and, hence, can again be used for the fixation of a further amount of atmospheric nitrogen. It will also be apparent that other chemicals may be placed in the retort or other solutions used in the absorber. If metallic sodium Na and charcoal or carbon C be placed in the retort together with magnesium nitrid $Mg_3N_2$, and ammonia $NH_3$ be passed through the shaft S, at a temperature from 200° to 300° C., the ammonia and sodium readily reduce the magnesium nitrid, and sodium cyanid is formed in the retort and may be removed through the opening and manhead C. Any excess of ammonia and hydrogen will then pass into the absorber and the excess of ammonia may be recovered. In this reaction a higher temperature may be maintained in the retort if desired, and the ammonia may be inserted in a compressed or liquefied form and if desired, the temperature may be regulated by this liquefied ammonia. The reaction when using metallic sodium and ammonia will be $$Mg_3N_2 + 3Na + 3C + NH_3 = 3NaCN + 3H + 3Mg.$$

I have discovered that in all the reactions in the retort where nitrogen is caused to react, the presence of metallic magnesium Mg exercises a very beneficial effect. Ordinarily the nitrogen readily escapes in the reactions where ammonia is decomposed or is caused to react, but with the presence of metallic magnesium, owing to the ability of the metallic magnesium, when the temperature is slightly raised to act with nitrogen, the nitrogen is caused to more readily react by the presence of the metallic magnesium. In the ordinary formation of cyanogen $C_2N_2$ the heat of formation is a negative value approximating 65 calories. The heat of formation in the presence of hydrogen forming hydrocyanic acid has a less negative value. The heat of formation to form a cyanid either with ammonia or with an alkali such as potassium or sodium possesses a positive value of from 5 to 30 calories. It is, therefore, possible to form ammonia cyanid, a metal cyanid, or to form hydrocyanic acid with less energy than is required in the formation of the cyanogen radical alone.

In the above reactions I prefer to unite the cyanogen radical with a metal or its equivalent such as hydrogen, ammonia or an alkali metal in order to utilize the lower heat of formation and diminish the amount of energy required in the formation of the compounds. In all of the above reactions the nitrogen utilized may be obtained directly from the atmosphere, from spent flue gases or from other sources, with or without concentration or purification and both the nitrogen and ammonia may be inserted in a gaseous form or in a liquid form and the temperature of the retort may be altered by the combined action of the resistance R and that due to the cooling action of the expansion of liquid ammonia or nitrogen. It will also be apparent that ammonium cyanid may be formed directly from ammonia and carbon or from ammonia, hydrogen and carbon by simply heating carbon in the retort to a temperature of 1,000° C. to 1,100° C. and passing ammonia or a mixture of ammonia and hydrogen through the pipe S and causing an intimate mixture with the highly heated carbon, or the alkaline earth metals may be reduced directly from their salts in the presence of the highly heated carbon and nitrogen or ammonia caused to react with them. These reactions require a temperature of 1,400° C. to 1,500° C., whereas the reactions with metals capable of forming nitrids from nitrogen or ammonia, take place at from 300° C. to 600° C. depending on the metals used. Magnesium forming a nitrid with nitrogen at about 400° C. while iron forms a nitrid with ammonia at about 700° C.

In all reactions involving the formation of ammonium cyanid or hydrocyanic acid it is desirable to absorb the gases effectively on account of their extremely poisonous character. Various salt solutions may be used to absorb the gases, forming a cyanid of a metal when decomposed by the gases from the retort.

In certain of the following claims I have used the word "metal" to include not only elements commonly classified as such but also the element hydrogen, which, though not always classified as a metal, is recognized to possess many of the properties thereof and under the circumstances described acts as such. It will be obvious that the metal and carbon which I employ need not be in the elemental state, for it may be advisable to employ some ready sources of metal and carbon such as the salts of the former or the combinations of the latter with hydrogen.

I claim:

1. The process of preparing nitrogenous compounds which comprises treating a metal nitrid with ammonia in the presence of heated carbonaceous material.

2. The process of preparing nitrogenous compounds which comprises treating magnesium nitrid with ammonia in the presence of heated carbonaceous material.

3. The process of preparing nitrogenous compounds which comprises treating magnesium nitrid with ammonia in the presence of heated carbonaceous material and a metal.

4. The process of preparing nitrogenous compounds which comprises treating a metal nitrid with ammonia and hydrogen in the presence of heated carbonaceous material.

5. The process of preparing nitrogenous compounds which comprises treating an alkaline earth metal nitrid with hydrogen and ammonia in contact with heated carbonaceous material.

6. The process of preparing nitrogenous compounds which comprises treating a nitrid of magnesium with ammonia and hydrogen in contact with heated carbonaceous material.

7. The process of preparing nitrogenous compounds which consists in treating an alkali earth metal with nitrogen to form a nitrid and treating the nitrid with carbonaceous material and ammonia to form a cyanid and restoring the metal to a condition capable of again uniting with nitrogen.

8. The process of preparing nitrogenous compounds which consists in treating magnesium with nitrogen to form a nitrid and treating the magnesium nitrid with carbonaceous material and ammonia to form a cyanid and restoring the magnesium to a condition capable of again uniting with nitrogen.

9. The process of preparing nitrogenous compounds which consists in treating an alkaline earth metal with nitrogen to form a nitrid, and treating the nitrid with ammonia in the presence of highly heated carbonaceous material to form a cyanid.

LELAND L. SUMMERS.

Witnesses:
 S. E. HIBBEN,
 LOUIS B. ERWIN.